US011042757B2

(12) United States Patent
Inata et al.

(10) Patent No.: US 11,042,757 B2
(45) Date of Patent: Jun. 22, 2021

(54) IMAGE PROCESSING DEVICE AND IMAGE CAPTURING APPARATUS

(71) Applicant: HITACHI AUTOMOTIVE SYSTEMS, LTD., Hitachinaka (JP)

(72) Inventors: Keisuke Inata, Tokyo (JP); Satoshi Sano, Tokyo (JP); Shinichi Nonaka, Hitachinaka (JP)

(73) Assignee: HITACHI AUTOMOTIVE SYSTEMS, LTD., Ibaraki (JP)

( * ) Notice: Subject to any disclaimer, the term of this patent is extended or adjusted under 35 U.S.C. 154(b) by 95 days.

(21) Appl. No.: 16/331,799

(22) PCT Filed: Jul. 24, 2017

(86) PCT No.: PCT/JP2017/026730
§ 371 (c)(1),
(2) Date: Mar. 8, 2019

(87) PCT Pub. No.: WO2018/061428
PCT Pub. Date: Apr. 5, 2018

(65) Prior Publication Data
US 2019/0244037 A1    Aug. 8, 2019

(30) Foreign Application Priority Data
Sep. 28, 2016  (JP) .............................. JP2016-189307

(51) Int. Cl.
G06K 9/00    (2006.01)
G06T 7/20    (2017.01)
H04N 7/18    (2006.01)
G01C 21/26   (2006.01)
G06T 7/55    (2017.01)
G06T 7/00    (2017.01)
(Continued)

(52) U.S. Cl.
CPC ......... *G06K 9/00791* (2013.01); *G01C 21/26* (2013.01); *G01C 21/265* (2013.01);
(Continued)

(58) Field of Classification Search
None
See application file for complete search history.

(56) References Cited

U.S. PATENT DOCUMENTS

2011/0282558 A1* 11/2011 Park ................... B60W 30/143
701/94
2012/0216208 A1   8/2012 Takemura et al.
(Continued)

FOREIGN PATENT DOCUMENTS

EP    3032457 A1    6/2016
JP    2001-099662 A   4/2001
(Continued)

OTHER PUBLICATIONS

Extended European Search Report dated May 19, 2020 for European Patent Application No. 17855386.3.
(Continued)

*Primary Examiner* — Vikkram Bali
(74) *Attorney, Agent, or Firm* — Volpe Koenig

(57) ABSTRACT

An image processing device mounted to a vehicle includes a motion feature extracting unit is configured to create motion information indicative of a motion of an observation target from a captured image including the observation target around the vehicle, a distance feature extracting unit is configured to calculate a distance from the vehicle to the observation target based on the captured image, and a recognition unit is configured to execute a recognition process of the observation target based on process results of the motion feature extracting unit and the distance feature extracting unit. The motion feature extracting unit and the distance feature extracting unit have respective operation processing amounts changed based on a predetermined vehicle state.

9 Claims, 14 Drawing Sheets

(51) Int. Cl.
  *G08G 1/16* (2006.01)
  *G06T 1/00* (2006.01)
  *G06T 7/60* (2017.01)
  *H04N 5/225* (2006.01)
  *H04N 5/232* (2006.01)
  *G06T 7/50* (2017.01)

(52) U.S. Cl.
  CPC ............... *G06T 1/00* (2013.01); *G06T 7/00* (2013.01); *G06T 7/20* (2013.01); *G06T 7/50* (2017.01); *G06T 7/55* (2017.01); *G06T 7/60* (2013.01); *G08G 1/16* (2013.01); *H04N 5/225* (2013.01); *H04N 5/232* (2013.01); *H04N 7/18* (2013.01); *H04N 7/181* (2013.01); *G06T 2207/30252* (2013.01)

(56) References Cited

U.S. PATENT DOCUMENTS

| | | | |
|---|---|---|---|
| 2013/0013164 A1* | 1/2013 | Taguchi | B60W 30/143 701/96 |
| 2013/0311043 A1* | 11/2013 | Kobana | B60T 7/12 701/41 |
| 2016/0114798 A1* | 4/2016 | Kim | B60W 30/09 701/41 |
| 2016/0173858 A1* | 6/2016 | Beon | G06K 9/00986 348/46 |

FOREIGN PATENT DOCUMENTS

| | | |
|---|---|---|
| JP | 2011-248640 A | 12/2011 |
| JP | 2014-178836 A | 9/2014 |
| JP | 2014-182602 A | 9/2014 |
| WO | 2011/055581 A1 | 5/2011 |

OTHER PUBLICATIONS

European Office Action and Search Report dated May 19, 2020 for European Patent Application No. 17855386.3.
International Search Report dated Sep. 26, 2017 for the International PCT Application No. PCT/JP2017/026730.

* cited by examiner

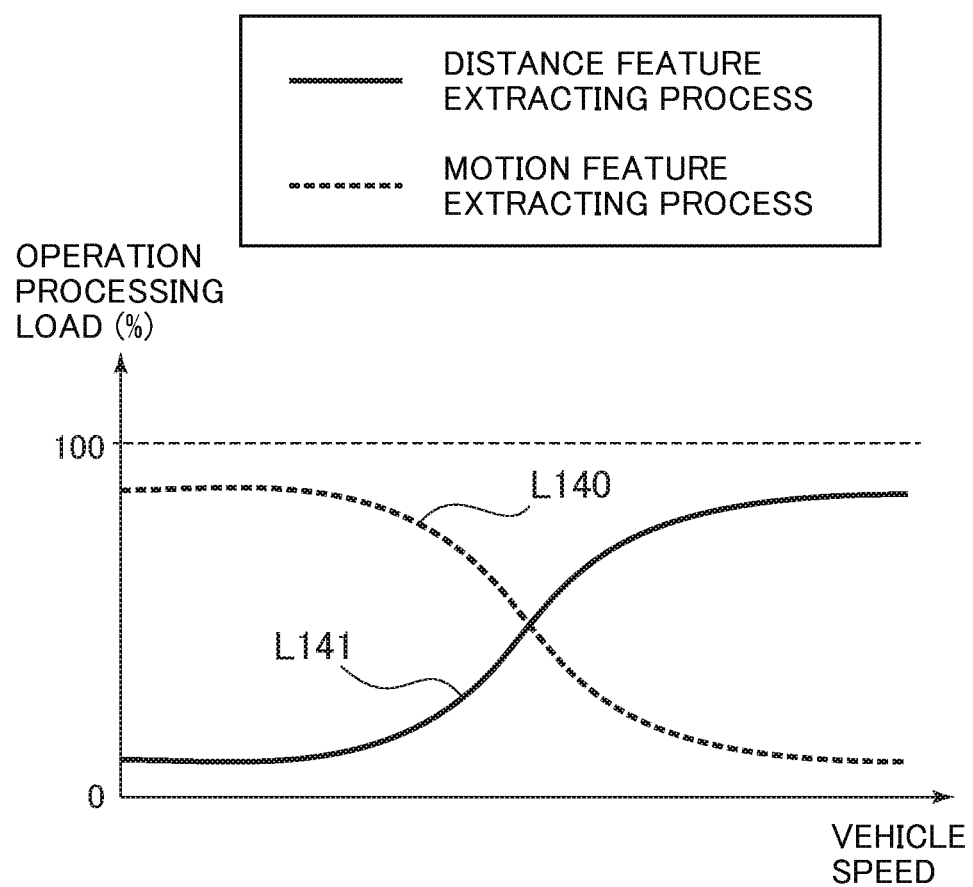

IMAGE PROCESSING DEVICE AND IMAGE CAPTURING APPARATUS

TECHNICAL FIELD

The present invention relates to an image processing device and an image capturing apparatus.

BACKGROUND ART

There has been conventionally known a technique that calculates a distance to an observation target and a motion vector of the observation target from an image obtained with a stereo camera mounted to a vehicle and uses these calculation results for a recognition process of the observation target to achieve a detection of the observation target around the vehicle including a pedestrian (see Patent Literature 1).

CITATION LIST

Patent Literature

Patent Literature 1: Japanese Unexamined Patent Application Publication No. 2011-248640

SUMMARY OF INVENTION

Technical Problem

The technique disclosed in Patent Literature 1 needs to concurrently execute the respective distance calculation process and motion vector calculation process individually, regardless of the vehicle state. Therefore, the use of an operation circuit having a high process capability or a circuit size that allows simultaneous execution of these processes is required, leading to an increase in product cost.

Solution to Problem

An image processing device according to the present invention is mounted to a vehicle. The image processing device includes a motion feature extracting unit is configured to create motion information indicative of a motion of an observation target from a captured image including the observation target around the vehicle, a distance feature extracting unit is configured to calculate a distance from the vehicle to the observation target based on the captured image, and a recognition unit is configured to execute a recognition process of the observation target based on process results of the motion feature extracting unit and the distance feature extracting unit. The motion feature extracting unit and the distance feature extracting unit have respective operation processing amounts changed based on a predetermined vehicle state.

The image capturing apparatus according to the present invention includes the image processing device and one or two or more cameras coupled to the image processing device. The one or two or more cameras are configured to obtain the captured image.

Advantageous Effects of Invention

The present invention can provide the apparatus that detects the observation target around the vehicle at low cost.

BRIEF DESCRIPTION OF DRAWINGS

FIG. 14 is a drawing illustrating a state where respective operation processing amounts of a distance feature extracting unit and a motion feature extracting unit are changed according to the vehicle speed.

DESCRIPTION OF EMBODIMENTS

The following describes embodiments of the present invention with reference to the drawings.

First Embodiment

Figure 1:
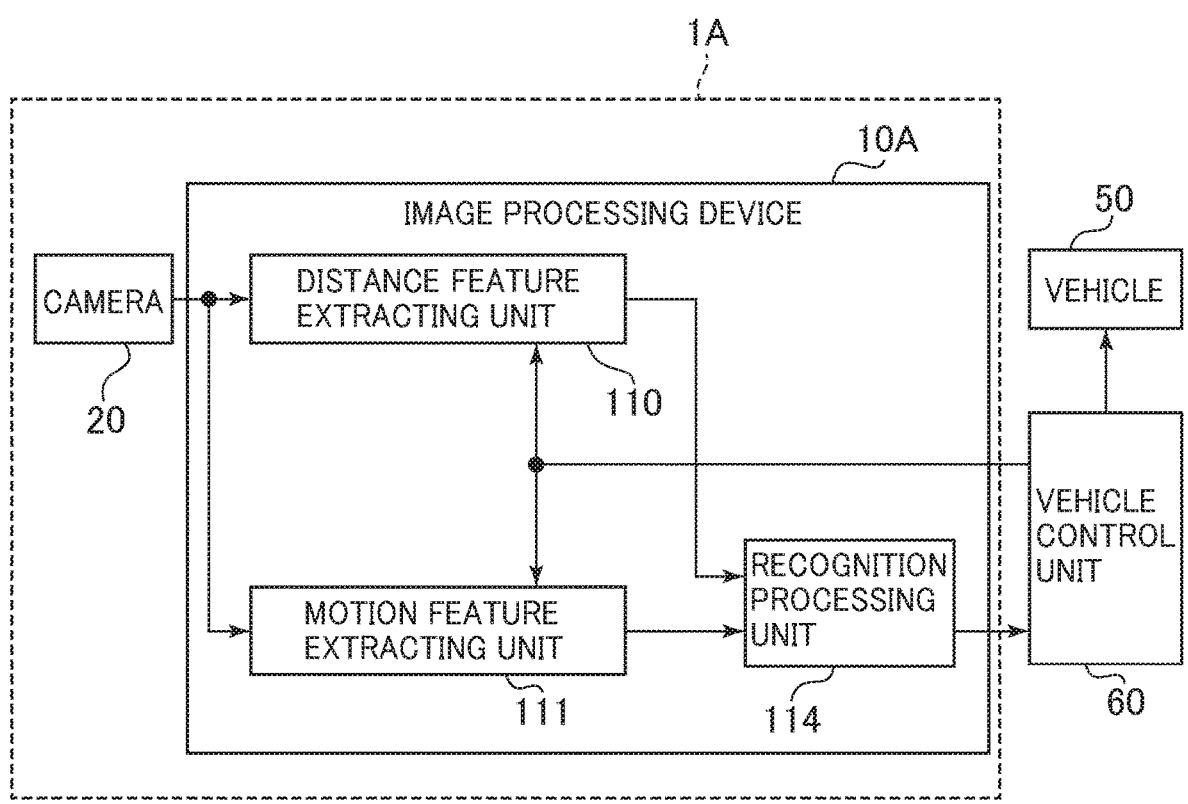
FIG. 1 is a drawing illustrating a configuration of an image capturing apparatus according to a first embodiment of the present invention.

FIG. 1 is a drawing illustrating a configuration of an image capturing apparatus 1A according to the first embodiment of the present invention. The image capturing apparatus 1A illustrated in FIG. 1 includes an image processing device 10A and a camera 20 coupled to the image processing device 10A and is coupled to a vehicle control unit 60.

The camera 20 is installed to a vehicle 50 such that an image around the vehicle 50, for example, a predetermined range ahead of the vehicle 50 can be captured. The camera 20 obtains a captured image including an observation target around the vehicle 50 and outputs the captured image to the image processing device 10A. The observation target around the vehicle 50 includes, for example, another vehicle, a pedestrian, a bicycle, an obstacle, a construction, a traffic sign, and a curb present around the vehicle 50.

The image processing device 10A is mounted to the vehicle 50 together with the camera 20. The image processing device 10A includes a distance feature extracting unit 110, a motion feature extracting unit 111, and a recognition processing unit 114 as functions. The captured image output from the camera 20 to the image processing device 10A is input to the respective distance feature extracting unit 110 and motion feature extracting unit 111 in the image processing device 10A. The image processing device 10A includes, for example, a CPU, a ROM, and a RAM (not illustrated). The execution of a predetermined program stored in the ROM by the CPU allows achieving the distance feature extracting unit 110, the motion feature extracting unit 111, and the recognition processing unit 114. Alternatively, these units may be achieved using hardware such as FPGA.

The distance feature extracting unit 110 executes a distance feature extracting process to calculate a distance from the vehicle 50 to the observation target based on the captured image input from the camera 20. The distance feature extracting unit 110 can calculate the distance from the vehicle 50 to the observation target by, for example, the well-known calculation method considering an installation position, an image capturing direction, an angle of view, and similar condition of the camera 20 based on the position of the observation target in the captured image. When the distance feature extracting unit 110 has calculated the distance from the vehicle 50 to the observation target, the distance feature extracting unit 110 outputs distance information indicative of the calculation result to the recognition processing unit 114.

The motion feature extracting unit 111 executes a motion feature extracting process to extract the motion of the observation target seen from the vehicle 50 based on the captured image input from the camera 20. The motion feature extracting unit 111 can extract the motion of the observation target by, for example, the well-known method based on a change in the position of the observation target in a plurality of captured images obtained in chronological order. When the motion feature extracting unit 111 has extracted the motion of the observation target, the motion feature extracting unit 111 outputs motion information indicative of the motion to the recognition processing unit 114.

The recognition processing unit 114 executes the recognition process of the observation target based on respective operation processing results of the motion feature extracting unit 111 and the distance feature extracting unit 110. The recognition processing unit 114 executes, for example, the well-known recognition process based on the distance information input from the distance feature extracting unit 110 and the motion information input from the motion feature extracting unit 111 to obtain a degree of danger of the observation target with respect to the running vehicle 50 and a travelling direction of the vehicle 50. When the recognition processing unit 114 has executed the recognition process of the observation target, the recognition processing unit 114 outputs sensed information based on the process result to the vehicle control unit 60. The sensed information output from the recognition processing unit 114 includes, for example, location information, kind information, behavior information, and danger information of the sensed observation target. The location information is information indicative of, for example, a direction and a distance of the observation target with respect to the vehicle 50. The kind information is information indicative of, for example, a pedestrian, an adult, a child, an old person, an animal, a fallen rock, a bicycle, a surrounding vehicle, a surrounding construction, and a curb. The behavior information is information indicative of, for example, a wander, a rushing-out, a crossing, a moving direction, a moving speed, and a moving trajectory of the pedestrian and the bicycle. The danger information is information indicative of, for example, a rushing-out of a pedestrian, the fallen rock, an abnormal behavior by the surrounding vehicle (such as a sudden stop, a sudden deceleration, and an abrupt steering).

The vehicle control unit 60 performs a control on the vehicle 50 based on the process result of the recognition processing unit 114. The vehicle control unit 60 controls, for example, a braking, a steering angle, and an accelerator position of the vehicle 50, lighting states of various lamps, and an output of an alarm based on the sensed information input from the recognition processing unit 114. The vehicle control unit 60 may control the motion of the camera 20 or output information on the observation target based on the process result of the recognition processing unit 114 to the surrounding vehicle and a central device connected to the vehicle 50 over a network. Furthermore, the vehicle control unit 60 may display an image to cause a driver of the vehicle 50 to recognize the observation target using the captured image obtained with the camera 20 or provide the information on the observation target based on the process result of the recognition processing unit 114 to an information device such as a navigation device mounted to the vehicle 50.

The vehicle control unit 60 outputs vehicle information indicative of a predetermined vehicle state in the vehicle 50 to the image processing device 10A. This vehicle information is input to the respective distance feature extracting unit 110 and motion feature extracting unit 111 in the image processing device 10A. The distance feature extracting unit 110 and the motion feature extracting unit 111 control respective operation processing loads according to the vehicle information supplied from the vehicle control unit 60. One exemplary method of the control of the operation processing loads, for example, performs a control such that the sum of the operation processing load on the distance feature extracting unit 110 and the operation processing load on the motion feature extracting unit 111 does not exceed a predetermined process load. Accordingly, the image processing device 10A can change the respective operation processing amounts of the motion feature extracting unit 111 and the distance feature extracting unit 110 based on the state of the vehicle 50.

The vehicle state indicated by the vehicle information output from the vehicle control unit 60 includes, for example, a vehicle speed, an acceleration, a steering angle, and a running mode of the vehicle 50, map information according to a position of the vehicle 50 on a map, and a traffic situation of a road on which the vehicle 50 is running. The running mode includes, for example, a running mode based on a track, a running mode based on a running situation, a running mode based on a surrounding natural environment, and an energy saving mode running in power-saving or fuel consumption saving. The running mode based on the track includes, for example, an urban area running mode, an ordinary road running mode, and an expressway running mode. The running mode based on the running situation includes, for example, a running mode in traffic jam, a parking area mode, and a running mode according to the position and the motion of the surrounding vehicle. The running mode based on the surrounding natural environment includes, for example, a nighttime running mode and a running mode in backlight. The map information according to the position of the vehicle 50 on the map, which is information indicative of an attribute of the position of the vehicle 50 on the map, includes, for example, road category information, road shape information, road surface feature information, road width information, lane information, and road gradient information. The road category information is information indicative of, for example, an alley, a national road, and an expressway. The road shape information is information indicative of, for example, a straight track, a curve road, a T-junction, and an intersection. The road surface feature information is information indicative of, for example, a signal, a roadway, a sidewalk, a railroad cross, a parking area for bicycles, a parking area for automobiles, and a crosswalk. The traffic situation of the road on which the vehicle 50 is running includes, for example, a traffic jam situation, presence/absence of a traffic regulation such as a speed limit and a traffic ban, and presence/absence of another running route different from the current running route.

FIG. 14 illustrates the vehicle information indicative of the vehicle speed of the vehicle 50 as an example of an operation processing load control according to the vehicle information in the image capturing apparatus 1A. FIG. 14 illustrates a state where the respective operation processing amounts of the distance feature extracting unit 110 and the motion feature extracting unit 111 are changed according to the vehicle speed. In FIG. 14, the horizontal axis indicates the magnitude of the vehicle speed and the vertical axis indicates the magnitude of the operation processing load.

As illustrated in FIG. 14, with the slow vehicle speed of the vehicle 50, the respective operation processing amounts of the motion feature extracting unit 111 and the distance feature extracting unit 110 are controlled such that the operation processing load of the motion feature extracting process indicated by a graph L140 becomes relatively high and the operation processing load of the distance feature extracting process indicated by a graph L141 becomes relatively low. The respective operation processing amounts of the motion feature extracting unit 111 and the distance feature extracting unit 110 are controlled such that, as the vehicle speed of the vehicle 50 increases from here, while the operation processing load of the motion feature extracting process indicated by the graph L140 gradually decreases, the operation processing load of the distance feature extracting process indicated by the graph L141 gradually increases. This allows appropriately changing the operation processing loads of both processes according to the vehicle speed and configuring the sum of the loads to be 100% or less.

As described above, according to this embodiment, while the sum of the operation processing amounts of the distance feature extracting unit 110 and the motion feature extracting unit 111 to be 100% or less, these operation processing amounts can be configured to be appropriate distributions according to the vehicle speed. That is, during running at low speed, to extract the detailed motion information on the observation target at a close distance around the vehicle 50, the operation processing amount of the motion feature extracting unit 111 is set to be relatively high. Meanwhile, during running at high speed, to extract the further detailed distance information to the observation target at a distant place around the vehicle 50, the operation processing amount of the distance feature extracting unit 110 is configured to be relatively high. Consequently, accuracies of the distance information and the motion information can be flexibly changed according to the state of the vehicle 50; therefore, even when the image processing device 10A only has the limited operation processing amount, the observation target can be appropriately sensed.

According to the above-described first embodiment of the present invention, the image processing device 10A mounted to the vehicle 50 includes the motion feature extracting unit 111, the distance feature extracting unit 110, and the recognition unit 114. The motion feature extracting unit 111 is configured to create the motion information indicative of the motion of the observation target from the captured image including the observation target around the vehicle 50. The distance feature extracting unit 110 is configured to calculate the distance from the vehicle 50 to the observation target based on the captured image. The recognition unit 114 is configured to execute the recognition process of the observation target based on the process results of the motion feature extracting unit 111 and the distance feature extracting unit 110. The motion feature extracting unit 111 and the distance feature extracting unit 110 have the respective operation processing amounts changed based on the predetermined vehicle state. This configuration allows providing the image processing device that detects the observation target around the vehicle at low cost.

Second Embodiment

Figure 2:
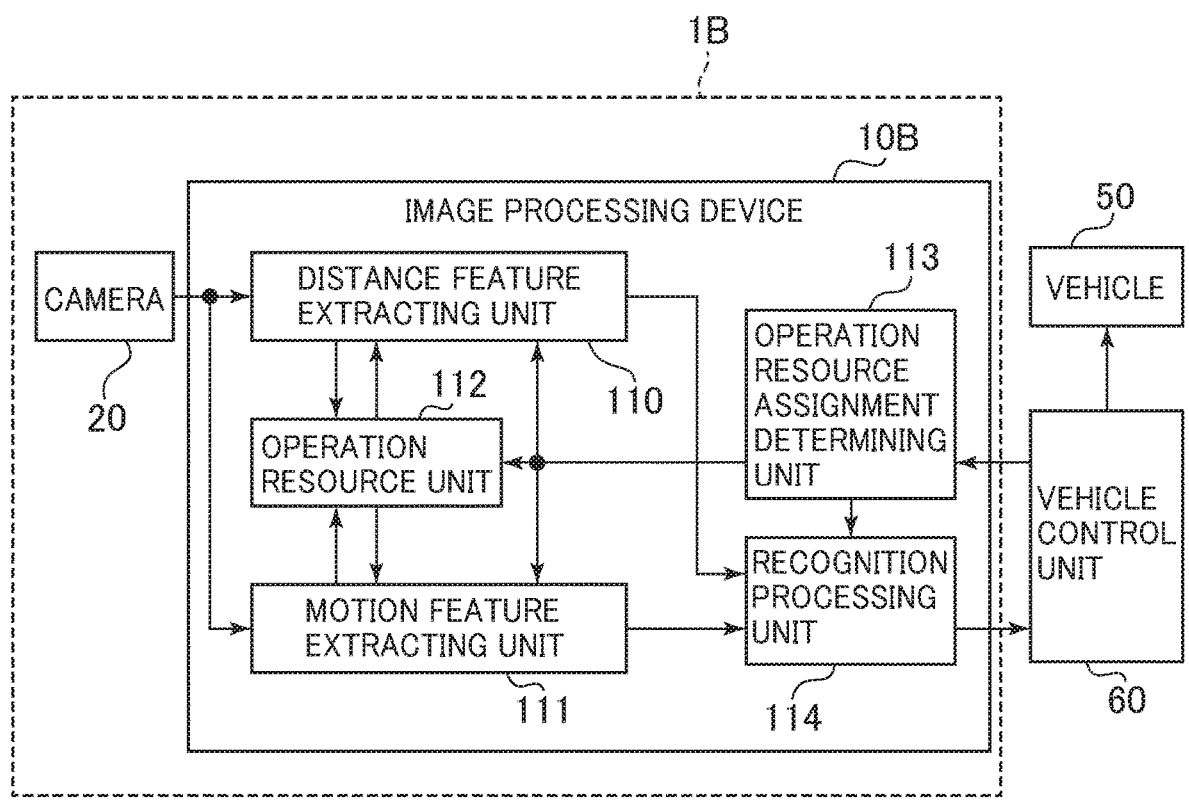
FIG. 2 is a drawing illustrating a configuration of an image capturing apparatus according to a second embodiment of the present invention.

FIG. 2 is a drawing illustrating a configuration of an image capturing apparatus 1B according to the second embodiment of the present invention. The image capturing apparatus 1B illustrated in FIG. 2 includes an image processing device 10B and the camera 20 coupled to the image processing device 10B and is coupled to the vehicle control unit 60. Since the camera 20 and the vehicle control unit 60 are identical to the ones described in the first embodiment, the following omits the descriptions.

The image processing device 10B is mounted to the vehicle 50 similarly to the image processing device 10A described in the first embodiment. The image processing device 10B further includes an operation resource unit 112 and an operation resource assignment determining unit 113 in addition to the distance feature extracting unit 110, the motion feature extracting unit 111, and the recognition processing unit 114 identical to those of the image processing device 10A as functions.

The operation resource unit 112 is an operation resource shared for use by the distance feature extracting unit 110 and the motion feature extracting unit 111. The operation resource unit 112 is, for example, a CPU that executes predetermined operation processing and an FPGA into which a predetermined operation circuit is incorporated.

In this embodiment, the vehicle information output from the vehicle control unit 60 to the image processing device 10B is input to the operation resource assignment determining unit 113 in the image processing device 10B. The operation resource assignment determining unit 113 determines proportions of the operation resource unit 112 assigned to the respective motion feature extracting unit 111 and distance feature extracting unit 110, namely, operation resource proportions based on the state of the vehicle 50 indicated by the vehicle information supplied from the vehicle control unit 60. Then, operation resource assignment information indicative of the respective determined operation resource proportions is output to the distance feature extracting unit 110, the motion feature extracting unit 111, and the operation resource unit 112. For example, an assignment proportion of the operation resource unit 112 assigned to any one of the motion feature extracting process executed by the motion feature extracting unit 111 and the distance feature extracting process executed by the distance feature extracting unit 110 and proportions of the operation resource unit 112 assigned to the respective distance feature extracting process and motion feature extracting process are usable as the operation resource assignment information.

The respective distance feature extracting unit 110 and motion feature extracting unit 111 execute the operation processing using the operation resource unit 112 according to the operation resource proportions assigned to the respective units based on the operation resource assignment information supplied from the operation resource assignment determining unit 113. Thus, the image processing device 10B can change the respective operation processing amounts of the motion feature extracting unit 111 and the distance feature extracting unit 110 according to the proportions of the operation resource unit 112 determined by the operation resource assignment determining unit 113 based on the state of the vehicle 50.

In this embodiment, while the distance feature extracting process and the motion feature extracting process are the two processes as the assignment targets of the operation resource unit 112, the operation resource unit 112 may be assigned to three or more processes.

Figure 5:
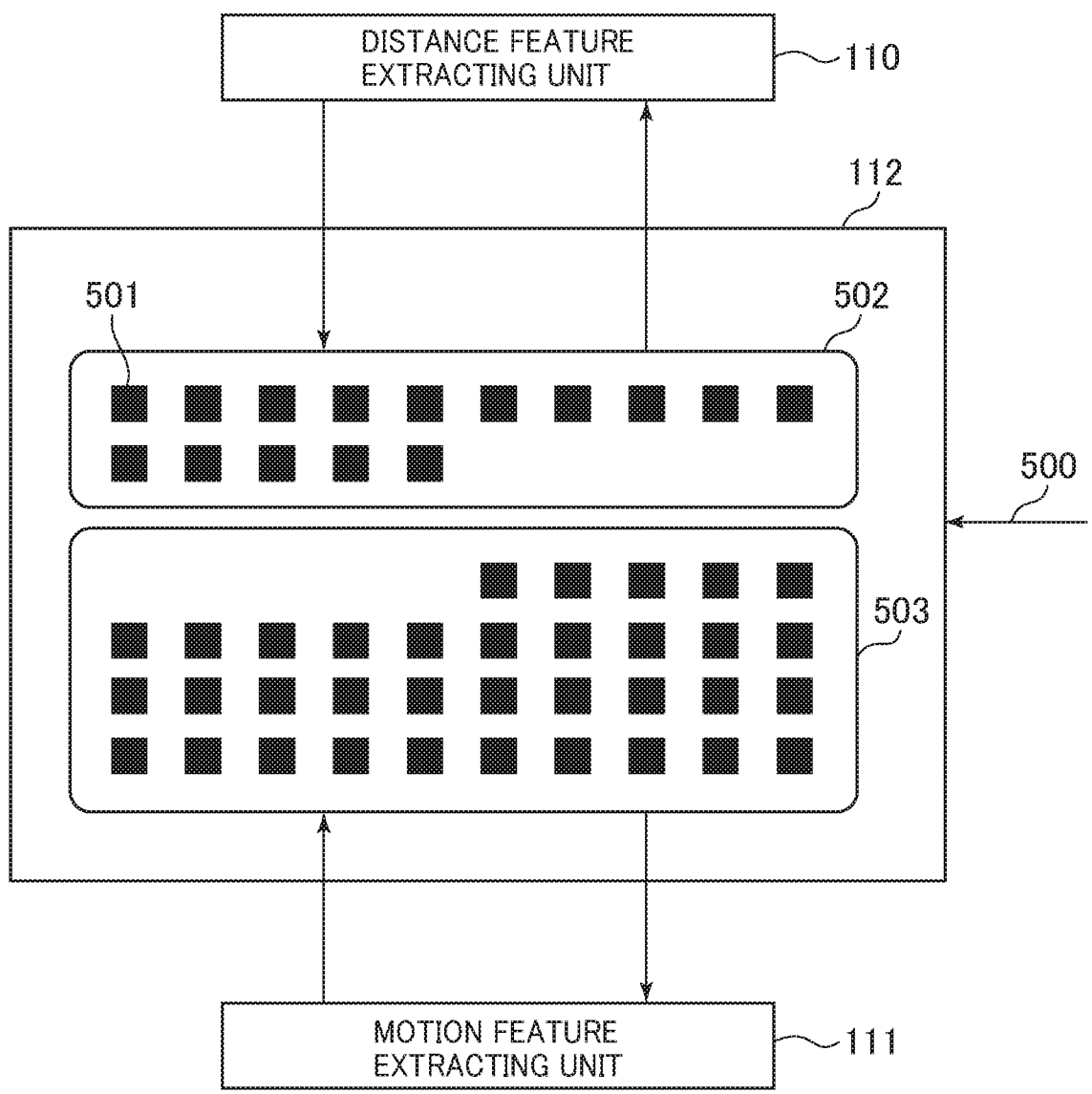
FIG. 5 is a drawing illustrating an example of an assignment of an operation resource unit.

FIG. 5 is a drawing illustrating a specific example of the assignment of the operation resource unit 112. As illustrated by squares filled with black in FIG. 5, the operation resource unit 112 includes a plurality of operation resources 501 shared for use by the distance feature extracting process in the distance feature extracting unit 110 and the motion feature extracting process in the motion feature extracting unit 111. The operation resource assignment determining unit 113 inputs operation resource assignment information 500 to the operation resource unit 112. The operation resource unit 112 determines whether the respective operation resources 501 are assigned to which of the distance feature extracting process and the motion feature extracting process based on this operation resource assignment information 500.

The example illustrated in FIG. 5 illustrates an example where, among all operation resources 501 that the operation resource unit 112 has, an operation resource group 502 including 30% of the operation resources 501 is assigned to the distance feature extracting process and an operation resource group 503 including the remaining 70% operation resources 501 is assigned to the motion feature extracting process. That is, 30% of the operation resources among all operation resources that the operation resource unit 112 has are assigned to the operation resource group 502 used by the distance feature extracting unit 110, and 70% of the operation resources among all operation resources that the operation resource unit 112 has are assigned to the operation resource group 503 used by the motion feature extracting unit 111. The operation resource group 502 obtains operation input information from the distance feature extracting unit 110 and outputs operation output information obtained as a result of operation processing of the operation input information to the distance feature extracting unit 110. The operation resource group 503 obtains operation input information from the motion feature extracting unit 111 and outputs operation output information obtained as a result of operation processing of the operation input information to the motion feature extracting unit 111.

Figure 6:
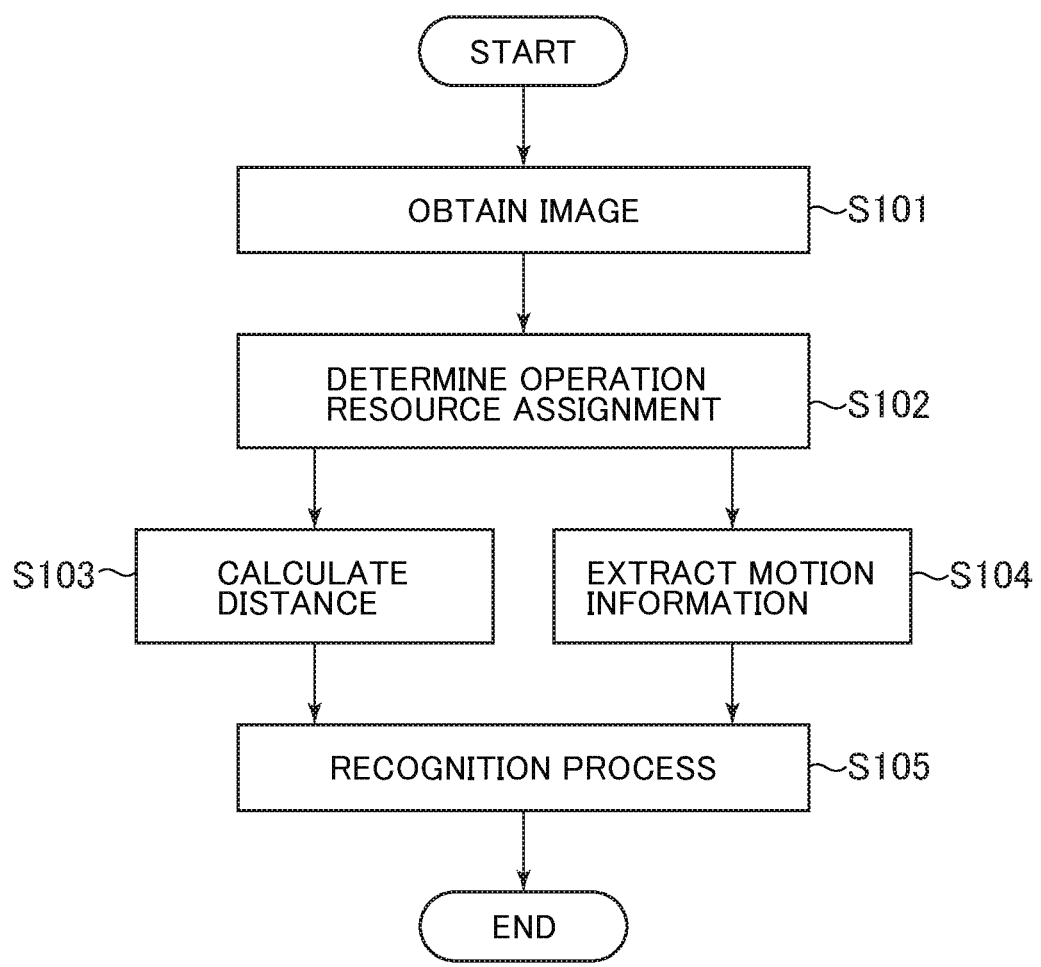
FIG. 6 is an example of a process flow executed by an image processing device.

FIG. 6 is an example of a process flow executed by the image processing device 10B of the second embodiment of the present invention.

At Step S101, the image processing device 10B inputs image data output from the camera 20 to the distance feature extracting unit 110 and the motion feature extracting unit 111.

At Step S102, the image processing device 10B determines the proportions of the operation resource unit 112 assigned to the respective distance feature extracting process executed by the distance feature extracting unit 110 and motion feature extracting process executed by the motion feature extracting unit 111 by the operation resource assignment determining unit 113. Here, following a process flow of FIG. 7 described later, the operation resource assignment determining unit 113 executes an operation resource assignment determining process to determine the operation resource proportions assigned to the respective distance feature extracting process and motion feature extracting process. Then, the operation resource assignment determining unit 113 creates the operation resource assignment information based on the determined operation resource proportions and outputs the operation resource assignment information to the distance feature extracting unit 110, the motion feature extracting unit 111, and the operation resource unit 112.

At Step S103, the image processing device 10B executes the distance feature extracting process by the distance feature extracting unit 110 based on the operation resource assignment information output from the operation resource assignment determining unit 113 at Step S102. In this distance feature extracting process, the distance feature extracting unit 110 uses the operation resource unit 112 in accordance with the operation resource proportion for the distance feature extracting process indicated by the operation resource assignment information to create the distance information, which indicates the distance to the observation target present around the vehicle 50. When the operation resource proportion assigned to the distance feature extracting process is, for example, 100%, since all operation resources that the operation resource unit 112 has are usable for the distance feature extracting process, high load operation processing is executable. When the operation resource proportion assigned to the distance feature extracting process is 0%, the distance feature extracting unit 110 does not execute the distance feature extracting process.

At Step S104, the image processing device 10B executes the motion feature extracting process by the motion feature extracting unit 111 based on the operation resource assignment information output from the operation resource assignment determining unit 113 at Step S102. In this motion feature extracting process, the motion feature extracting unit 111 uses the operation resource unit 112 in accordance with the operation resource proportion for the motion feature extracting process indicated by the operation resource assignment information to create the motion information indicative of the motion of the observation target present around the vehicle 50. When the operation resource proportion assigned to the motion feature extracting process is, for example, 100%, since all operation resources that the operation resource unit 112 has are usable for the motion feature extracting process, high load operation processing is executable. When the operation resource proportion assigned to the motion feature extracting process is 0%, the motion feature extracting unit 111 does not execute the motion feature extracting process.

At Step S105, the image processing device 10B executes the recognition process to detect the observation target by the recognition processing unit 114 based on the distance information created at Step S103 and the motion information created at Step S104. When the image processing device 10B has executed the recognition process at Step S105, the image processing device 10B outputs the sensed information based on the recognition process result from the recognition processing unit 114 to the vehicle control unit 60 and terminates the process flow shown in FIG. 6.

Figure 7:
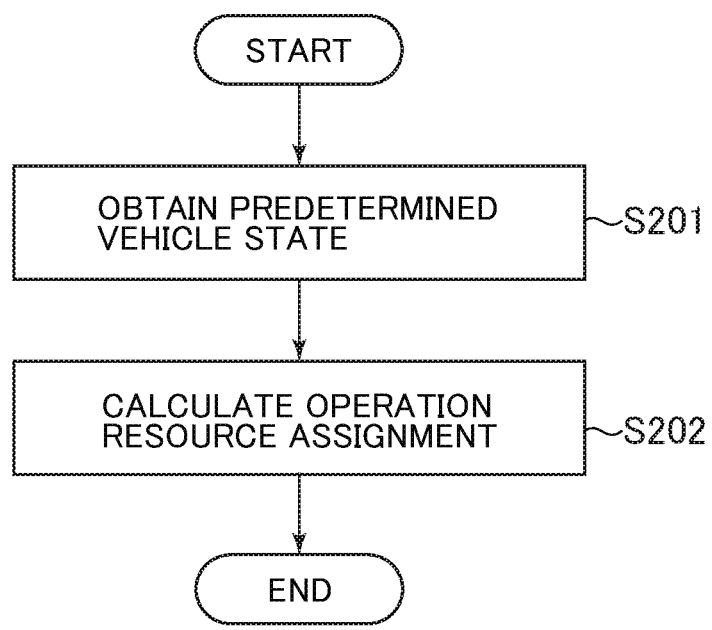
FIG. 7 is an example of a drawing illustrating a process flow of an operation resource assignment determining process.

Here, the following describes the operation resource assignment determining process executed at Step S102 in FIG. 6 with reference to FIG. 7. FIG. 7 is an example of a drawing illustrating the process flow of the operation resource assignment determining process.

At Step S201 of FIG. 7, the operation resource assignment determining unit 113 obtains a predetermined vehicle state of the vehicle 50 to determine the operation processing amounts of the motion feature extracting unit 111 and the distance feature extracting unit 110. Here, by inputting the vehicle information supplied from the vehicle control unit 60 to the operation resource assignment determining unit 113, the predetermined vehicle state indicated by the vehicle information is obtained.

At Step S202 of FIG. 7, the operation resource assignment determining unit 113 determines the operation resource proportions assigned to the respective distance feature extracting process and motion feature extracting process based on the vehicle state obtained at Step S201. Then, the operation resource assignment determining unit 113 creates the operation resource assignment information according to the determined operation resource proportions for the respective processes and outputs the operation resource assignment information to the distance feature extracting unit 110, the motion feature extracting unit 111, and the operation resource unit 112. When the process at Step S202 has been executed, the operation resource assignment determining unit 113 terminates the process flow shown in FIG. 7.

The following describes the determination method for the operation resource proportion based on various vehicle states by the operation resource assignment determining unit 113 with reference to FIGS. 8 to 13.

(Determination Method for Operation Resource Proportion Based on Vehicle Speed)

Figure 8:
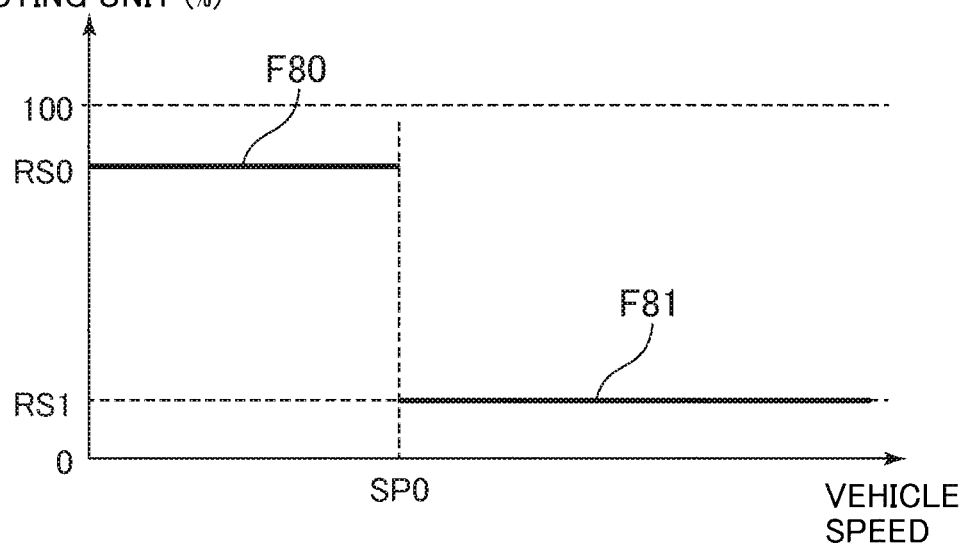
FIG. 8 is a drawing describing an example of a determination method for an operation resource proportion based on a vehicle speed.

FIG. 8 is a drawing describing an example of the determination method for the operation resource proportion based on the vehicle speed. In this example, the vehicle information supplied from the vehicle control unit 60 indicates the vehicle speed of the vehicle 50. The operation resource assignment determining unit 113 receives this vehicle information and determines the respective operation resource proportions for the distance feature extracting unit 110 and the motion feature extracting unit 111, for example, in accordance with a relationship between the vehicle speed and the operation resource assignment proportion illustrated in FIG. 8. In FIG. 8, the horizontal axis indicates the magnitude of the vehicle speed and the vertical axis indicates the magnitude of the operation resource assignment proportion for the motion feature extracting unit 111, that is, the magnitude of the operation resource proportion assigned to the motion feature extracting process.

The operation resource assignment determining unit 113 determines the respective operation resource proportions for the distance feature extracting unit 110 and the motion feature extracting unit 111 based on the vehicle speed of the vehicle 50 indicated by the vehicle information as follows. For example, with the vehicle speed having a predetermined value of SP0 or less, as indicated by reference numeral F80 in FIG. 8, while the operation resource assignment proportion for the motion feature extracting unit 111 is set to RS0 (%), the operation resource assignment proportion for the distance feature extracting unit 110 is set to (100−RS0) (%). Additionally, with the vehicle speed exceeding the predetermined value SP0, as indicated by reference numeral F81, while the operation resource assignment proportion for the motion feature extracting unit 111 is set to RS1 (%), the operation resource assignment proportion for the distance feature extracting unit 110 is set to (100−RS1) (%). At this time, by setting 0% to RS1, the calculation of the motion information with the vehicle speed exceeding the predetermined value SP0 can be stopped. Accordingly, with the vehicle speed exceeding the predetermined value SP0, the function of the motion feature extracting unit 111 can be stopped and the behavior of the camera 20 can be stopped, thereby ensuring lowering power consumption of the image capturing apparatus 1B.

The use of the above-described determination method for the operation resource proportion allows sensing the motion of the observation target present around the vehicle 50 in further detail when the vehicle 50 is running in an urban area, on an alley, or similar road at low speed. During ordinary running (during the vehicle speed in excess of SP0), a high load process is possible for the distance feature extracting process and a distance sensing performance of the observation target at the distant place can be improved.

Figure 9:
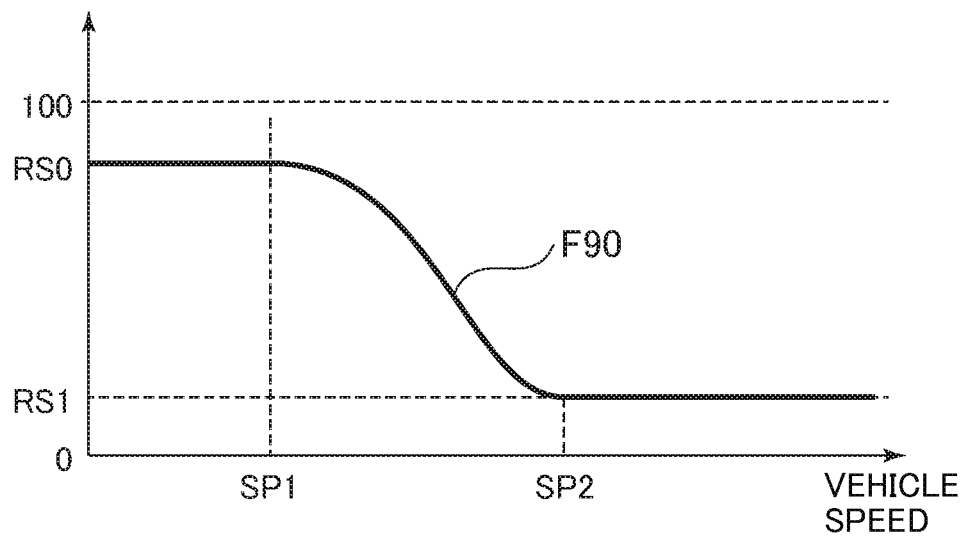
FIG. 9 is a drawing describing another one example of the determination method for the operation resource proportion based on the vehicle speed.

FIG. 9 is a drawing describing another one example of the determination method for the operation resource proportion based on the vehicle speed. In this example, the vehicle information supplied from the vehicle control unit 60 indicates the vehicle speed of the vehicle 50 similarly to the example described in FIG. 8. The operation resource assignment determining unit 113 receives this vehicle information and determines the respective operation resource proportions for the distance feature extracting unit 110 and the motion feature extracting unit 111, for example, in accordance with a relationship between the vehicle speed and the operation resource assignment proportion illustrated in FIG. 9. In FIG. 9, the horizontal axis indicates the magnitude of the vehicle speed and the vertical axis indicates the magnitude of the operation resource assignment proportion for the motion feature extracting unit 111, that is, the magnitude of the operation resource proportion assigned to the motion feature extracting process.

The operation resource assignment determining unit 113 determines the respective operation resource proportions for the distance feature extracting unit 110 and the motion feature extracting unit 111 based on the vehicle speed of the vehicle 50 indicated by the vehicle information in accordance with a function indicated by reference numeral F90 in FIG. 9. In the relationship between the vehicle speed indicated by the function F90 and the operation resource assignment proportion for the motion feature extracting unit 111, the operation resource assignment proportion for the motion feature extracting unit 111 is RS0 from the vehicle speed of 0 to a predetermined value SP1, and the operation resource assignment proportion for the motion feature extracting unit 111 gradually changes from RS0 to RS1 from the vehicle speed of SP1 to SP2. While setting the value indicated by the function F90 to the operation resource assignment proportion for the motion feature extracting unit 111, the operation resource assignment determining unit 113 sets a value found by subtracting the operation resource assignment proportion for the motion feature extracting unit 111 from 100% to the operation resource assignment proportion for the distance feature extracting unit 110.

The use of the above-described determination method for the operation resource proportion allows sensing the motion of the observation target present around the vehicle 50 in further detail when the vehicle 50 is running in an urban area, on an alley, or similar road at low speed similarly to the example described in FIG. 8. During running at high speed, a high load process is possible for the distance feature extracting process and the distance sensing performance of the observation target at the distant place can be improved. Furthermore, during running at medium speed, the proportion for the operation resource unit 112 assigned to the motion feature extracting process is gradually increased as the vehicle speed lowers, thus ensuring reducing a sudden gap in accuracy of the motion information and the distance information during the transition period.

(Determination Method for Operation Resource Proportion Based on Running Mode)

Figure 10:
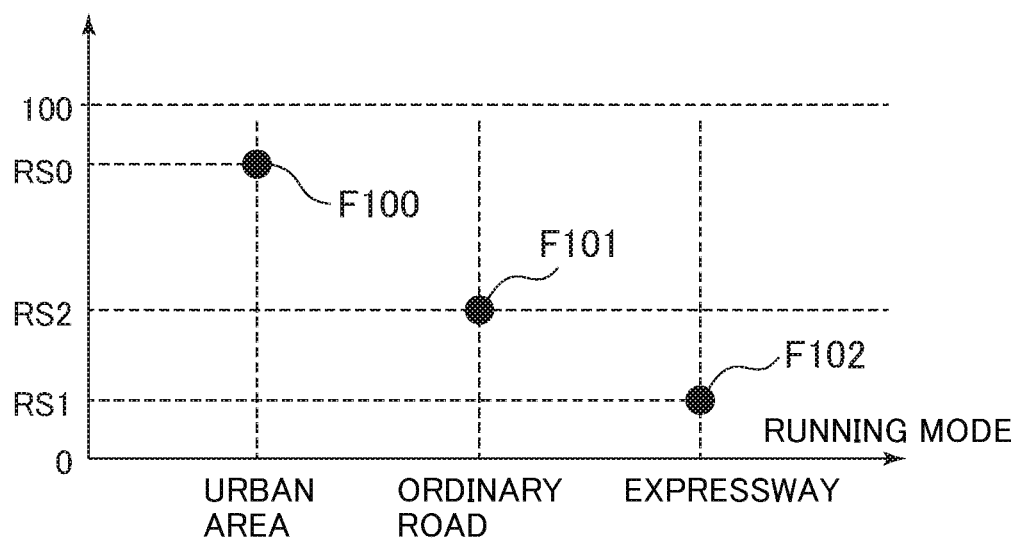
FIG. 10 is a drawing describing an example of the determination method for the operation resource proportion based on a running mode.

FIG. 10 is a drawing describing an example of the determination method for the operation resource proportion based on the running mode. In this example, the vehicle information supplied from the vehicle control unit 60 indicates the running mode of the vehicle 50. The operation resource assignment determining unit 113 receives this vehicle information and determines the respective operation resource proportions for the distance feature extracting unit 110 and the motion feature extracting unit 111, for example, in accordance with a relationship between the running mode and the operation resource assignment proportion illustrated in FIG. 10. In FIG. 10, the horizontal axis indicates the running mode and the vertical axis indicates the magnitude of the operation resource assignment proportion for the motion feature extracting unit 111, that is, the magnitude of the operation resource proportion assigned to the motion feature extracting process.

The operation resource assignment determining unit 113 determines the respective operation resource proportions for the distance feature extracting unit 110 and the motion feature extracting unit 111 based on the running mode of the vehicle 50 indicated by the vehicle information as follows. For example, with the running mode being the urban area running mode, as indicated by reference numeral F100 in FIG. 10, while the operation resource assignment proportion for the motion feature extracting unit 111 is set to RS0 (%), the operation resource assignment proportion for the distance feature extracting unit 110 is set to (100−RS0) (%). With the running mode being the ordinary road running mode, as indicated by reference numeral F101, while the operation resource assignment proportion for the motion feature extracting unit 111 is set to RS2 (%), the operation resource assignment proportion for the distance feature extracting unit 110 is set to (100−RS2) (%). With the running mode being the expressway running mode, as indicated by reference numeral F102, while the operation resource assignment proportion for the motion feature extracting unit 111 is set to RS1 (%), the operation resource assignment proportion for the distance feature extracting unit 110 is set to (100−RS1) (%).

The use of the above-described determination method for the operation resource proportion allows sensing the motion of the observation target present around the vehicle 50 in further detail while the vehicle 50 is running in an urban area. During running on an expressway, a high load process is possible for the distance feature extracting process and the distance sensing performance of the observation target at the distant place can be improved. Furthermore, during running on an ordinary road, the respective motion feature extracting process and distance feature extracting process are executed with the operation processing amounts in good balance. While the motion of the observation target is sensed near the vehicle 50, the distance to the observation target at the distant place can also be simultaneously sensed.

(Determination Method for Operation Resource Proportion Based on Map Information)

Figure 11:
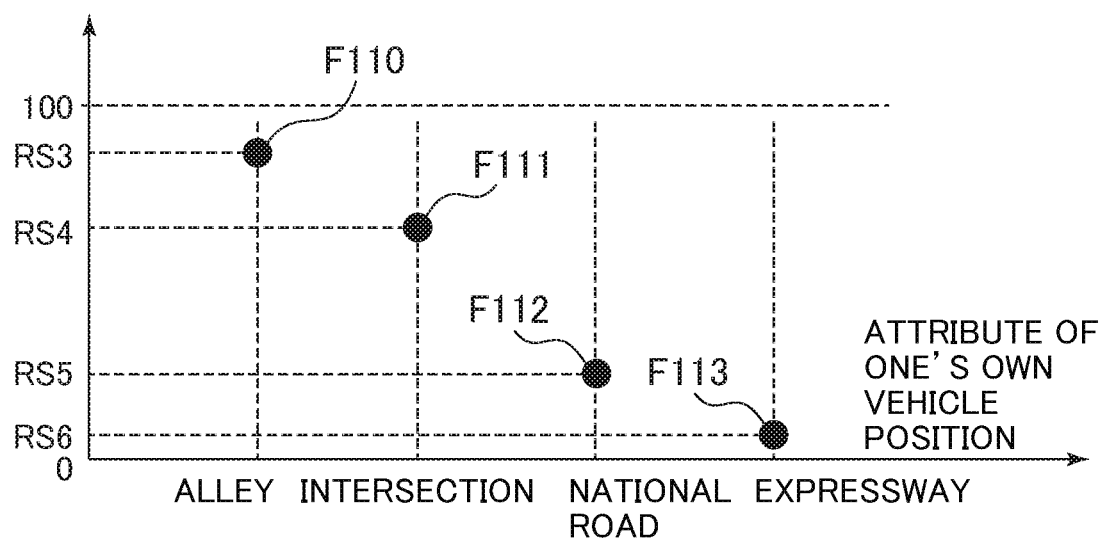
FIG. 11 is a drawing describing an example of the determination method for the operation resource proportion based on map information.

FIG. 11 is a drawing describing an example of the determination method for the operation resource proportion based on the map information. In this example, the vehicle information supplied from the vehicle control unit 60 indicates the position of the vehicle 50 on the map, that is, the map information according to one's own vehicle position. The operation resource assignment determining unit 113 receives this vehicle information and determines the respective operation resource proportions for the distance feature extracting unit 110 and the motion feature extracting unit 111, for example, in accordance with a relationship between the map information on one's own vehicle position and the operation resource assignment proportion illustrated in FIG. 11. In FIG. 11, the horizontal axis indicates an attribute of one's own vehicle position indicated by the map information and the vertical axis indicates the magnitude of the operation resource assignment proportion for the motion feature extracting unit 111, that is, the magnitude of the operation resource proportion assigned to the motion feature extracting process.

The operation resource assignment determining unit 113 determines the respective operation resource proportions for the distance feature extracting unit 110 and the motion feature extracting unit 111 based on the map information according to one's own vehicle position indicated by the vehicle information as follows. For example, with the attribute of one's own vehicle position indicated by the map information being the alley, as indicated by reference numeral F110 in FIG. 11, while the operation resource assignment proportion for the motion feature extracting unit 111 is set to RS3 (%), the operation resource assignment proportion for the distance feature extracting unit 110 is set to (100−RS3) (%). Additionally, with the attribute of one's own vehicle position indicated by the map information being the intersection, as indicated by reference numeral F111, while the operation resource assignment proportion for the motion feature extracting unit 111 is set to RS4 (%), the operation resource assignment proportion for the distance feature extracting unit 110 is set to (100−RS4) (%). With the attribute of one's own vehicle position indicated by the map information being the national road, as indicated by reference numeral F112, while the operation resource assignment proportion for the motion feature extracting unit 111 is set to RS5 (%), the operation resource assignment proportion for the distance feature extracting unit 110 is set to (100−RS5) (%). With the attribute of one's own vehicle position indicated by the map information being the expressway, as indicated by reference numeral F113, while the operation resource assignment proportion for the motion feature extracting unit 111 is set to RS6 (%), the operation resource assignment proportion for the distance feature extracting unit 110 is set to (100−RS6) (%).

The use of the above-described determination method for the operation resource proportion allows appropriately adjusting the respective operation processing amounts of the motion feature extracting process and the distance feature extracting process according to the position of the vehicle 50 corresponding to which attribute on the map.

(Determination Method for Operation Resource Proportion Based on Traffic Situation)

Figure 12:
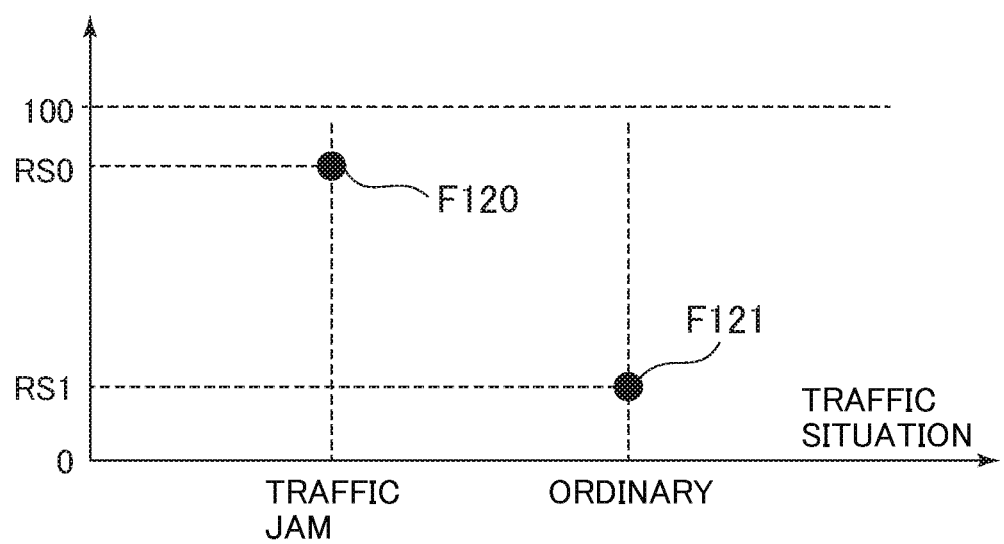
FIG. 12 is a drawing describing an example of the determination method for the operation resource proportion based on a traffic situation.

FIG. 12 is a drawing describing an example of the determination method for the operation resource proportion based on the traffic situation. In this example, the vehicle information supplied from the vehicle control unit 60 indicates the road on which the vehicle 50 is running, that is, the traffic situation of the running road. The operation resource assignment determining unit 113 receives this vehicle information and determines the respective operation resource proportions for the distance feature extracting unit 110 and the motion feature extracting unit 111, for example, in accordance with a relationship between the traffic situation and the operation resource assignment proportion illustrated in FIG. 12. In FIG. 12, the horizontal axis indicates the traffic situation of the running road and the vertical axis indicates the magnitude of the operation resource assignment proportion for the motion feature extracting unit 111, that is, the magnitude of the operation resource proportion assigned to the motion feature extracting process.

The operation resource assignment determining unit 113 determines the respective operation resource proportions for the distance feature extracting unit 110 and the motion feature extracting unit 111 based on the traffic situation of the running road indicated by the vehicle information as follows. For example, with the running road in a traffic jam, as indicated by reference numeral F120 in FIG. 12, while the operation resource assignment proportion for the motion feature extracting unit 111 is set to RS0 (%), the operation resource assignment proportion for the distance feature extracting unit 110 is set to (100−RS0) (%). Additionally, with the traffic situation of the running road being ordinary, namely, not in a traffic jam, as indicated by reference numeral F121, while the operation resource assignment proportion for the motion feature extracting unit 111 is set to RS1 (%), the operation resource assignment proportion for the distance feature extracting unit 110 is set to (100−RS1) (%).

The use of the above-described determination method for the operation resource proportion allows sensing the motion of the observation target present around the vehicle 50 in further detail while the vehicle 50 is running on the road in the traffic jam at low speed. While the vehicle 50 is running on the road not in the traffic jam at an ordinary speed, a high load process is possible for the distance feature extracting process and the distance sensing performance of the observation target at the distant place can be improved.

(Determination Method for Operation Resource Proportion Based on Map Information and Vehicle Speed)

Figure 13:
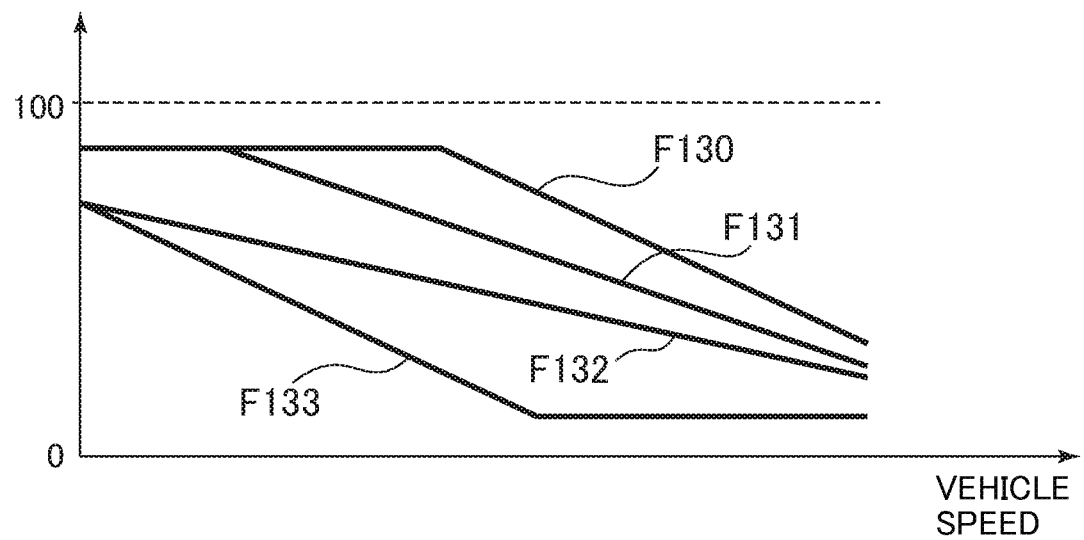
FIG. 13 is a drawing describing an example of the determination method for the operation resource proportion based on the map information and the vehicle speed.

FIG. 13 is a drawing describing an example of the determination method for the operation resource proportion based on the map information and the vehicle speed. In this example, the vehicle information supplied from the vehicle control unit 60 indicates the position of the vehicle 50 on the map, that is, the map information according to one's own vehicle position, in addition to the vehicle speed of the vehicle 50. The operation resource assignment determining unit 113 receives this vehicle information and determines the respective operation resource proportions for the distance feature extracting unit 110 and the motion feature extracting unit 111, for example, in accordance with a relationship between the vehicle speed and the operation resource assignment proportion illustrated in FIG. 13. In FIG. 13, the horizontal axis indicates the magnitude of the vehicle speed and the vertical axis indicates the magnitude of the operation resource assignment proportion for the motion feature extracting unit 111, that is, the magnitude of the operation resource proportion assigned to the motion feature extracting process.

The operation resource assignment determining unit 113 selects any of functions indicated by reference numerals F130 to F133 in FIG. 13 based on the map information according to one's own vehicle position indicated by the vehicle information. Based on the vehicle speed of the vehicle 50 indicated by the vehicle information, the operation resource assignment determining unit 113 determines the respective operation resource proportions for the distance feature extracting unit 110 and the motion feature extracting unit 111 in accordance with the selected function. For example, with the attribute of one's own vehicle position indicated by the map information being the alley, the operation resource assignment determining unit 113 selects the function F130 and sets a value indicated by the function F130 to the operation resource assignment proportion for the motion feature extracting unit 111. Additionally, with the attribute of one's own vehicle position indicated by the map information being the intersection, the operation resource assignment determining unit 113 selects the function F131 and sets a value indicated by the function F131 to the operation resource assignment proportion for the motion feature extracting unit 111. With the attribute of one's own vehicle position indicated by the map information being a national road, the operation resource assignment determining unit 113 selects the function F132 and sets a value indicated by the function F132 to the operation resource assignment proportion for the motion feature extracting unit 111. With the attribute of one's own vehicle position indicated by the map information being the expressway, the operation resource assignment determining unit 113 selects the function F133 and sets a value indicated by the function F133 to the operation resource assignment proportion for the motion feature extracting unit 111. In all cases, the operation resource assignment determining unit 113 sets the value found by subtracting the operation resource assignment proportion for the motion feature extracting unit 111 from 100% as the operation resource assignment proportion for the distance feature extracting unit 110.

The use of the above-described determination method for the operation resource proportion allows appropriately adjusting the proportions for the respective operation processing amounts of the motion feature extracting process and the distance feature extracting process according to the change in vehicle speed and according to the position of the vehicle 50 corresponding to which attribute on the map.

A plurality of the above-described determination methods for the operation resource proportions may be used in any combination. In addition to the above-described various examples, various determination methods for the operation resource proportions can be employed according to the kind of the vehicle information. That is, in this embodiment, as long as the method determines the respective proportions of the operation resource unit 112 assigned to the motion feature extracting unit 111 and the distance feature extracting unit 110 based on the predetermined vehicle state indicated by the vehicle information, any determination method for the operation resource proportion is usable.

According to the above-described second embodiment of the present invention, in addition to the configuration of the image processing device 10A described in the first embodiment, the image processing device 10B mounted to the vehicle 50 further includes the operation resource unit 112 and the operation resource assignment determining unit 113. The operation resource unit 112 is shared for use by the motion feature extracting unit 111 and the distance feature extracting unit 110. The operation resource assignment determining unit 113 is configured to determine the proportions of the operation resource unit 112 assigned to the respective motion feature extracting unit 111 and distance feature extracting unit 110 based on the predetermined vehicle state. According to the proportions of the operation resource unit 112 determined by the operation resource assignment determining unit 113, the respective operation processing amounts of the motion feature extracting unit 111 and the distance feature extracting unit 110 are changed. Thus, similarly to the first embodiment, this configuration allows providing the image processing device that detects the observation target around the vehicle at low cost.

Third Embodiment

Figure 3:
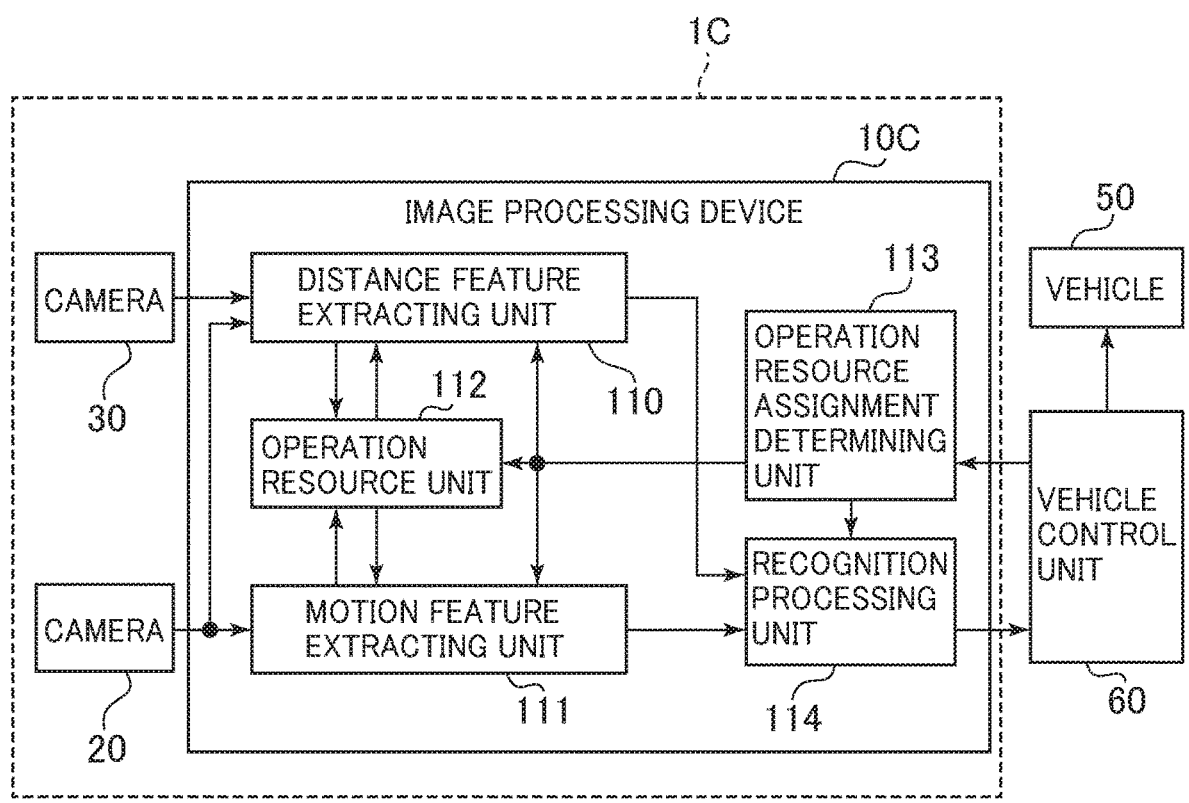
FIG. 3 is a drawing illustrating a configuration of an image capturing apparatus according to a third embodiment of the present invention.

FIG. 3 is a drawing illustrating a configuration of an image capturing apparatus 1C according to the third embodiment of the present invention. The image capturing apparatus 1C illustrated in FIG. 3 includes an image processing device 10C and the camera 20 and a camera 30 coupled to the image processing device 10C and is coupled to the vehicle control unit 60. Since the camera 20 and the vehicle control unit 60 are identical to the ones described in the first embodiment, the following omits the descriptions.

Similarly to the camera 20, the camera 30 is installed to the vehicle 50 such that an image around the vehicle 50, for example, a predetermined range ahead of the vehicle 50 can be captured. The camera 20 obtains the captured image including the observation target around the vehicle 50 and outputs the captured image to the image processing device 10C.

The image processing device 10C is mounted to the vehicle 50 similarly to the image processing devices 10A and 10B described in the respective first and second embodiments. Similarly to the image processing device 10B, the image processing device 10C includes the distance feature extracting unit 110, the motion feature extracting unit 111, the recognition processing unit 114, the operation resource unit 112, and the operation resource assignment determining unit 113 as functions.

In this embodiment, to the distance feature extracting unit 110, the captured image from the camera 20 and the captured image from the camera 30 are input. The distance feature extracting unit 110 executes the distance feature extracting process to calculate the distance from the vehicle 50 to the observation target based on the captured images input from the respective camera 20 and camera 30. The distance feature extracting unit 110 can calculate the distance from the vehicle 50 to the observation target based on, for example, a parallax between the captured image of the camera 20 and the captured image of the camera 30. When the distance from the vehicle 50 to the observation target has been calculated, the distance feature extracting unit 110 outputs the distance information indicative of the calculation result to the recognition processing unit 114, similarly to the first and second embodiments.

Meanwhile, similarly to the first and second embodiments, the captured image from the camera 20 is input to the motion feature extracting unit 111. Based on the captured image input from the camera 20, the motion feature extracting unit 111 extracts the motion of the observation target by the method similar to the first and second embodiments and outputs the motion information indicative of the motion to the recognition processing unit 114. The recognition processing unit 114 executes the recognition process of the observation target similarly to the description of the first embodiment based on the respective operation processing results of the motion feature extracting unit 111 and the distance feature extracting unit 110.

The behaviors of the operation resource unit 112 and the operation resource assignment determining unit 113 and the execution of the operation processing according to the operation resource proportions for the distance feature extracting unit 110 and the motion feature extracting unit 111 are similar to those described in the second embodiment. Therefore, this embodiment omits the descriptions of these configurations.

Fourth Embodiment

Figure 4:
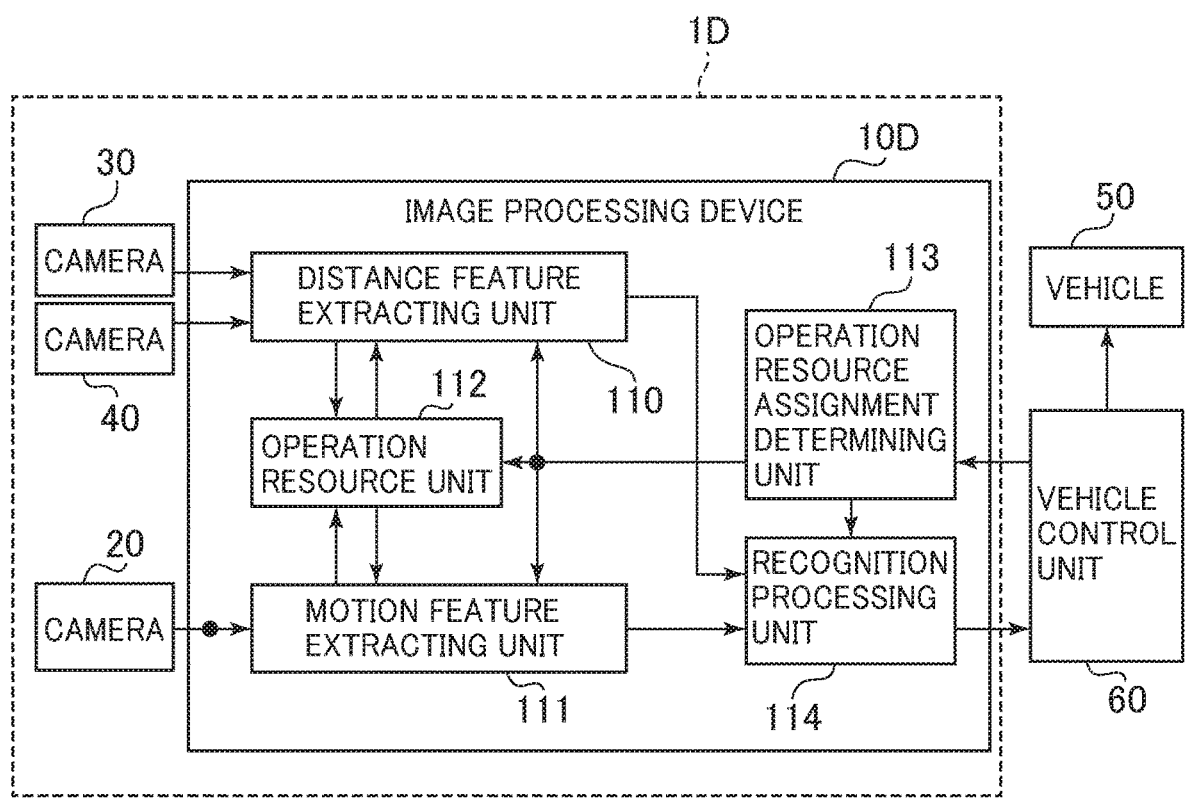
FIG. 4 is a drawing illustrating a configuration of an image capturing apparatus according to a fourth embodiment of the present invention.

FIG. 4 is a drawing illustrating a configuration of an image capturing apparatus 1D according to the fourth embodiment of the present invention. The image capturing apparatus 1D illustrated in FIG. 4 includes an image processing device 10D and the camera 20, the camera 30, and a camera 40 coupled to the image processing device 10D and is coupled to the vehicle control unit 60. Since the camera 20 and the vehicle control unit 60 are identical to the ones described in the first embodiment, the following omits the descriptions.

Similarly to the camera 20, the respective camera 30 and camera 40 are installed to the vehicle 50 such that the image around the vehicle 50, for example, the predetermined range ahead of the vehicle 50 can be captured. The respective camera 30 and camera 40 obtain the captured images including the observation target around the vehicle 50 and output the captured images to the image processing device 10D.

The image processing device 10D is mounted to the vehicle 50 similarly to the image processing devices 10A, 10B, and 10C described in the respective first to third embodiments. Similarly to the image processing devices 10B and 10C, the image processing device 10D includes the distance feature extracting unit 110, the motion feature extracting unit 111, the recognition processing unit 114, the operation resource unit 112, and the operation resource assignment determining unit 113 as functions.

In this embodiment, to the distance feature extracting unit 110, the captured image from the camera 30 and the captured image from the camera 40 are input. Similarly to the description in the third embodiment, the distance feature extracting unit 110 calculates the distance from the vehicle 50 to the observation target based on the respective captured images input from the camera 30 and the camera 40 and outputs the distance information indicative of the calculation results to the recognition processing unit 114.

Meanwhile, similar to the first to third embodiments, the captured image from the camera 20 is input to the motion feature extracting unit 111. Based on the captured image input from the camera 20, the motion feature extracting unit 111 extracts the motion of the observation target by the method similar to the first to third embodiments and outputs the motion information indicative of the motion to the recognition processing unit 114. The recognition processing unit 114 executes the recognition process of the observation target similarly to the description of the first embodiment based on the respective operation processing results of the motion feature extracting unit 111 and the distance feature extracting unit 110.

The behaviors of the operation resource unit 112 and the operation resource assignment determining unit 113 and the execution of the operation processing according to the operation resource proportions for the distance feature extracting unit 110 and the motion feature extracting unit 111 are similar to those described in the second embodiment. Therefore, this embodiment omits the descriptions of these configurations.

According to the present invention, the use of the methods described in the above-described respective embodiments allows achieving the recognition process of the observation target at low cost using the motion information and the distance information of the observation target.

The present invention is not limited to the above-described respective embodiments but includes various modifications. For example, the above-described respective embodiments have been described in detail for easy understanding of the present invention, and therefore, it is not necessarily limited to include all described configurations. It is possible to replace a part of the configuration of one embodiment with a configuration of another embodiment, and it is possible to add a configuration of another embodiment to a configuration of one embodiment. Some of the configurations of each embodiment can be added to, removed from, or replaced by another configuration.

A part of or all of the configurations described in the above-described respective embodiments may include hardware and may be achieved by execution of programs by a processor. Control lines and information lines considered necessary for the description are described. All of the control lines and the information lines of the product are not necessarily described. Actually, almost all configurations may be considered to be mutually coupled.

The above-described embodiments and various modifications are merely one example, and the present invention is not limited to these contents as long as the features of the invention are intact. While the various embodiments have been described above, the present invention is not limited to these contents. Other aspects considered within the scope of the technical idea of the present invention are also included in the scope of the present invention.

This application is based upon, and claims the benefit of priority from, corresponding Japanese Patent Application No. 2016-189307 filed in the Japan Patent Office on Sep. 28, 2016, the entire contents of which are incorporated herein by reference.

LIST OF REFERENCE SIGNS 1A, 1B, 1C, 1D image capturing apparatus
10A, 10B, 10C, 10D image processing device
20, 20, 40 camera
50 vehicle
60 vehicle control unit
110 distance feature extracting unit
111 motion feature extracting unit
112 operation resource unit
113 operation resource assignment determining unit
114 recognition processing unit

The invention claimed is:
1. An image processing device mounted to a vehicle, comprising:
a memory;
an input/output device; and
a processor communicatively coupled to the memory and the input/output device, wherein the processor is configured to:
create motion information indicative of a motion of an observation target from a captured image including the observation target around the vehicle;
calculate a distance from the vehicle to the observation target based on the captured image; and
execute a recognition process of the observation target based on process results of the motion information created and the distance calculated,
wherein an operation processing amount of creating the motion information and an operation processing amount of calculating the distance is changed based on a predetermined vehicle state,
wherein the operation processing amount of creating the motion information and the operation processing amount of calculating the distance on a condition are inverse amounts.
2. The image processing device according to claim 1,
wherein the processor is further configured to determine proportions of the operation processing amount of creating the motion information and proportions of the operation processing amount of calculating the distance based on the predetermined vehicle state,
wherein according to the proportions of the operation processing amount of creating the motion information and proportions of the operation processing amount of calculating the distance determined by the processor, the operation processing amount of creating the motion information and the operation processing amount of calculating the distance are changed.
3. The image processing device according to claim 1,
wherein the image processing device is coupled to a plurality of cameras,
the processor is configured to create the motion information based on the captured image obtained with any of the plurality of cameras, and
the processor is configured to calculate the distance to the observation target based on the respective captured images obtained with any of two or more of the plurality of cameras.
4. The image processing device according to claim 1,
wherein the predetermined vehicle state includes a vehicle speed of the vehicle.
5. The image processing device according to claim 1,
wherein the predetermined vehicle state includes a running mode of the vehicle.
6. The image processing device according to claim 1,
wherein the predetermined vehicle state includes map information according to a position of the vehicle on a map.
7. The image processing device according to claim 1,
wherein the predetermined vehicle state includes a traffic situation of a road on which the vehicle is running.
8. The image processing device according to claim 2,
wherein the predetermined vehicle state includes a vehicle speed of the vehicle, and
the processor is configured, such that when the vehicle speed of the vehicle falls below a predetermined value, to set the operation processing amount of creating the motion information to be relatively higher than in the case where the vehicle speed of the vehicle is equal to or more than the predetermined value.
9. An image capturing apparatus comprising:
the image processing device including: a memory, an input/output device, and a processor communicatively coupled to the memory and the input/output device; and
one or two or more cameras coupled to the image processing device, the one or two or more cameras being configured to obtain a captured image,
wherein the processor is configured to:
create motion information indicative of a motion of an observation target from the captured image including the observation target around the vehicle,
calculate a distance from the vehicle to the observation target based on the captured image, and
execute a recognition process of the observation target based on process results of the motion information created and the distance calculated, wherein an operation processing amount of creating the motion information and an operation processing amount of calculating the distance is changed based on a predetermined vehicle state, wherein the operation processing amount of creating the motion information and the operation processing amount of calculating the distance on a condition are inverse amounts.

\* \* \* \* \*